US011070110B2

(12) United States Patent
Tanaka

(10) Patent No.: US 11,070,110 B2
(45) Date of Patent: Jul. 20, 2021

(54) COOLING SYSTEM FOR ROTARY ELECTRIC MACHINE

(71) Applicant: HONDA MOTOR CO., LTD., Tokyo (JP)

(72) Inventor: Yoshinori Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 328 days.

(21) Appl. No.: 16/295,035

(22) Filed: Mar. 7, 2019

(65) Prior Publication Data

US 2019/0288583 A1 Sep. 19, 2019

(30) Foreign Application Priority Data

Mar. 14, 2018 (JP) ............................ JP2018-046949

(51) Int. Cl.
*H02K 9/19* (2006.01)
*H02K 9/00* (2006.01)
(Continued)

(52) U.S. Cl.
CPC ................ *H02K 9/19* (2013.01); *H02K 1/20* (2013.01); *H02K 1/32* (2013.01); *H02K 9/00* (2013.01);
(Continued)

(58) Field of Classification Search
CPC ........... H02K 9/19; H02K 9/193; H02K 9/20; H02K 1/20; H02K 1/32; H02K 5/20;
(Continued)

(56) References Cited

U.S. PATENT DOCUMENTS 6,833,641 B2 * 12/2004 Uchida .................. B60K 6/445 310/54
2003/0230274 A1 * 12/2003 Williams ............... F01M 5/005 123/196 R
2006/0223670 A1 * 10/2006 Nishikawa ........... B60W 10/02 477/168

FOREIGN PATENT DOCUMENTS

CN 102638132 8/2012
CN 105697125 6/2016
(Continued)

OTHER PUBLICATIONS

Ichikawa et al, Drive Device for Vehicle, Oct. 7, 2013, Aisin AW Co., JP 2013207929 (English Machine Translation) (Year: 2013 ).*
(Continued)

*Primary Examiner* — Quyen P Leung
*Assistant Examiner* — Alexander A Singh
(74) *Attorney, Agent, or Firm* — Amin, Turocy & Watson, LLP

(57) ABSTRACT

A cooling system includes a rotary electric machine, a pump that pumps coolant, a first coolant flow path that guides coolant to the rotary electric machine, a second coolant flow path branching off from the first coolant flow path, a pressure regulation valve provided in the second coolant flow path, a first orifice provided at downstream than the pressure regulation valve in the second coolant flow path in coolant flow direction, a third coolant flow path branching off from between the pressure regulation valve and the first orifice in the second coolant flow path and joining to a downstream than the branching position of the second coolant flow path in the first coolant flow path in coolant flow direction, and a switching valve provided in the third coolant flow path and that allows coolant flow to the first coolant flow path when experiencing a pressure of a threshold or more.

5 Claims, 6 Drawing Sheets

P5 36 46 45 1 12b1 12 12b2 P4 35 44 29 P3 P1 31 Pj 43 34 42 55 K1 40 32 30 F1 53 53h 51 52 50 33 P2 41 59 58

(51) Int. Cl.

| | |
|---|---|
| ***H02K 1/20*** | (2006.01) |
| ***H02K 1/32*** | (2006.01) |
| *H02K 21/14* | (2006.01) |
| *B60K 6/26* | (2007.10) |

(52) U.S. Cl.
CPC ............. *B60K 6/26* (2013.01); *B60Y 2200/91* (2013.01); *B60Y 2200/92* (2013.01); *B60Y 2306/05* (2013.01); *B60Y 2400/60* (2013.01); *H02K 21/14* (2013.01)

(58) Field of Classification Search
CPC ............ H02K 21/14; H02K 9/00; H02K 9/02; H02K 9/06; H02K 9/08; H02K 9/10; H02K 9/12; H02K 9/14; H02K 9/16; H02K 9/18; H02K 9/197; H02K 9/22; H02K 9/223; H02K 9/225; H02K 9/227; H02K 9/24; H02K 9/26; H02K 9/28; H02K 5/12; F01P 7/14; F01P 7/16; F01P 7/165; B60Y 2200/91; B60Y 2200/912; B60Y 2200/92; B60Y 2400/60; B60Y 2306/05; B60K 6/26
USPC ......... 310/52, 53, 54, 55, 56, 57, 58, 59, 64
See application file for complete search history.

(56) References Cited

FOREIGN PATENT DOCUMENTS

| | | |
|---|---|---|
| JP | 2006-187105 | 7/2006 |
| JP | 2012106599 A * | 6/2012 |
| JP | 2013-207929 | 10/2013 |
| JP | 2013207929 A * | 10/2013 |

OTHER PUBLICATIONS

Takei et al, Hybrid Vehicle, Jun. 7, 2012, Honda Motor Co. LTD, JP 2012106599 (English Machine Translation) (Year: 2012).*

Chinese Office Action for Chinese Patent Application No. 201910175098.7 dated Sep. 22, 2020.

* cited by examiner 29
30
58
59
Q1
Q2
31
41
40
32
P1
P2
33
1
12b2
46
36
P5
45
12b1
12
44
35
Q1
P4
Pj
43
34
P3
42
55
53
53h
52
50
51

29
30
58
59
Q1
Q2
41
31
40
Q2
P2
32
P1
Q1
33
Q3
1
12b2
46
36
55
42
Q1
34
P3
53h
53
52
50
51
P5
45
12b1
12
44
35
Q1
43
Pj
P4
Q3

COOLING SYSTEM FOR ROTARY ELECTRIC MACHINE

CROSS-REFERENCE TO RELATED APPLICATION

Priority is claimed on Japanese Patent Application No. 2018-046949, filed Mar. 14, 2018, the content of which is incorporated herein by reference.

BACKGROUND OF THE INVENTION

Field of the Invention

The present invention relates to a cooling system for a rotary electric machine.

Description of Related Art

In a rotary electric machine mounted on a hybrid automobile, an electric automobile, or the like, a magnetic field is formed on a stator core by supplying current to a coil, and a magnetic attractive force or repulsive force is generated between a magnet of a rotor and the stator core. Accordingly, the rotor rotates with respect to the stator.

Incidentally, in this rotary electric machine, since iron loss is increased in a high rotational speed state, a rotor core, a stator core, or the like, tends to easily generate heat. In the rotary electric machine, when heat is generated according to driving, this may lead to a decrease in performance Here, various configurations for cooling a rotary electric machine have been studied.

For example, Japanese Unexamined Patent Application, First Publication No. 2006-187105 discloses a structure in which a cooling water channel is provided in a circumferential portion of a motor case, which is an outer shell of an electric motor, and a cooling oil channel is provided in a circumferential portion of the motor case except the portion in which the cooling water channel is provided. In Japanese Unexamined Patent Application, First Publication No. 2006-187105, a flow rate of the cooling water channel and a flow rate of the cooling oil channel are controlled according to a temperature of the coil wound on a motor stator.

Meanwhile, a structure (hereinafter, referred to as "a structure in the related art") including a rotary electric machine, a pump configured to pump a coolant, a coolant flow path extending from the pump to the rotary electric machine and configured to guide the coolant, and an orifice provided in the coolant flow path is known. In the structure in the related art, cooling/lubrication is performed at a constant flow rate from a low rotational speed state (a low vehicle speed) to a high rotational speed state (a high vehicle speed).

SUMMARY OF THE INVENTION

However, since a flow rate is not increased at a high vehicle speed in the structure in the related art, a flow rate of a coolant (hereinafter, referred to as "a cooling flow rate") for cooling a rotary electric machine is not optimized according to a vehicle speed. For example, when a corresponding cooling flow rate is set for a high vehicle speed, cooling/lubrication may be excessively performed at a low vehicle speed (a regular low vehicle speed), and this may lead to deterioration in driving loss due to an increase in size of a pump or deterioration in movement friction of a power transmission mechanism.

An aspect of the present invention is directed to providing a cooling system for a rotary electric machine capable of optimizing a cooling flow rate according to a vehicle speed.

(1) A cooling system for a rotary electric machine according to an aspect of the present invention includes a rotary electric machine; a pump configured to increase and decrease a flow rate of a coolant according to a magnitude of a rotational speed of the rotary electric machine and pump the coolant; a first coolant flow path extending from the pump to the rotary electric machine and configured to guide the coolant to the rotary electric machine; a second coolant flow path branching off from the first coolant flow path and configured to guide the coolant to the pump; a pressure regulation part provided in the first coolant flow path and configured to regulate a pressure in the first coolant flow path; a flow rate regulation part provided at a position downstream than the pressure regulation part in the second coolant flow path in a flow direction of the coolant and configured to regulate a flow rate of the coolant; a third coolant flow path branching off from a position between the pressure regulation part and the flow rate regulation part in the second coolant flow path and joining to a position downstream than a branching position of the second coolant flow path in the first coolant flow path in the flow direction of the coolant; and a flow path switching part provided in the third coolant flow path and configured to allow a flow of the coolant to the first coolant flow path when experiencing a pressure of a threshold or more.

(2) In the aspect of the present invention, the cooling system for a rotary electric machine may further include a mechanism section mechanically connectable to the rotary electric machine; a fourth coolant flow path branching off from the first coolant flow path and configured to guide the coolant to the mechanism section; and a second flow rate regulation part provided in the fourth coolant flow path and configured to regulate a flow rate of the coolant.

(3) In the aspect of the present invention, the branching position of the fourth coolant flow path may be provided between the branching position of the second coolant flow path and a joining position of the third coolant flow path joining with the first coolant flow path.

(4) In the aspect of the present invention, the cooling system for a rotary electric machine may further include a third flow rate regulation part provided between the joining position of the third coolant flow path joining with the first coolant flow path and the branching position of the fourth coolant flow path from the first coolant flow path and configured to regulate a flow rate of the coolant.

(5) In the aspect of the present invention, the cooling system for a rotary electric machine may further include a fifth coolant flow path branching off from a position downstream than the third flow rate regulation part in the first coolant flow path in a flow direction of the coolant and configured to guide the coolant to a magnet of the rotary electric machine; and a fourth flow rate regulation part provided in the fifth coolant flow path and configured to regulate a flow rate of the coolant.

According to the aspect of (1), since the pump configured to increase/decrease a flow rate of the coolant according to a magnitude of a rotational speed of the rotary electric machine and pump the coolant is provided, a cooling flow rate at a high vehicle speed can be increased by increasing a flow rate of the coolant as a rotational speed of the rotary electric machine is increased, and cooling performance at a high vehicle speed can be improved. Meanwhile, a cooling flow rate at a low vehicle speed can be reduced by reducing a flow rate of the coolant as a rotational speed of the rotary electric machine is reduced, and excessive cooling can be avoided from being performed. In addition, since the second coolant flow path branching off from the first coolant flow path and configured to guide the coolant to the pump is provided, some (surplus coolant) of the coolant flowing through the first coolant flow path can be circulated in the second coolant flow path. In addition, since the pressure regulation part provided in the first coolant flow path and configured to regulate a pressure in the first coolant flow path is provided, a flow rate of the coolant flowing through the first coolant flow path can be regulated. In addition, since the flow rate regulation part provided at a position downstream than the pressure regulation part in the second coolant flow path in the flow direction of the coolant and configured to regulate a flow rate of the coolant is provided, a pressure in the second coolant flow path can be increased according to an increase in the coolant at a high vehicle speed. In addition, since the third coolant flow path branching off from a position between the pressure regulation part and the flow rate regulation part in the second coolant flow path and joining to a position downstream than a branching position of the second coolant flow path in the first coolant flow path in the flow direction of the coolant is provided, some of the coolant flowing through the second coolant flow path can flow toward the rotary electric machine through the third coolant flow path and the first coolant flow path. In addition, since the flow path switching part provided in the third coolant flow path and configured to allow a flow of the coolant to the first coolant flow path when experiencing a pressure of a threshold or more is provided, when the coolant flows from the second coolant flow path to the third coolant flow path and a pressure in the third coolant flow path becomes a threshold or more, the coolant from the second coolant flow path can flow toward the rotary electric machine through the third coolant flow path and the first coolant flow path. Accordingly, the cooling flow rate can be optimized according to a vehicle speed.

According to the aspect of (2), the mechanism section mechanically connectable to the rotary electric machine and the fourth coolant flow path branching off from the first coolant flow path and configured to guide the coolant to the mechanism section are provided, since some of the coolant flowing through the first coolant flow path can be guided to the mechanism section through the fourth coolant flow path, the mechanism section can be lubricated with the coolant. In addition, the second flow rate regulation part provided in the fourth coolant flow path and configured to regulate a flow rate of the coolant is provided, since a flow rate of the coolant flowing toward the mechanism section through the fourth coolant flow path is restricted, the coolant can actively flow toward the rotary electric machine through the first coolant flow path. That is, the rotary electric machine can be actively cooled by prioritizing a flow of the coolant to the rotary electric machine over the flow of the coolant to the mechanism section while lubricating the mechanism section with the coolant.

According to the aspect of (3), since the branching position of the fourth coolant flow path is provided between the branching position of the second coolant flow path and a joining position of the third coolant flow path joining with the first coolant flow path, the coolant flowing toward the rotary electric machine through the third coolant flow path and the first coolant flow path can be prevented from flowing to the mechanism section through the fourth coolant flow path.

According to the aspect of (4), since the third flow rate regulation part provided between the joining position of the third coolant flow path joining with the first coolant flow path and the branching position of the fourth coolant flow path from the first coolant flow path and configured to regulate a flow rate of the coolant is provided, the coolant flowing toward the rotary electric machine through the third coolant flow path and the first coolant flow path can be prevented from flowing to the mechanism section through the first coolant flow path.

According to the aspect of (5), when the fifth coolant flow path branching off from a position downstream than the third flow rate regulation part in the first coolant flow path in the flow direction of the coolant and configured to guide the coolant to the magnet of the rotary electric machine and the fourth flow rate regulation part provided in the fifth coolant flow path and configured to regulate a flow rate of the coolant are provided, since some of the coolant flowing through the first coolant flow path can be guided to the magnet through the fifth coolant flow path, the magnet can be cooled. In addition, the fourth flow rate regulation part provided in the fifth coolant flow path and configured to regulate a flow rate of the coolant is provided, since a flow rate of the coolant flowing toward the magnet through the fifth coolant flow path is restricted, the coolant can actively flow toward the rotary electric machine (for example, a coil) through the first coolant flow path.

DETAILED DESCRIPTION OF THE INVENTION

Hereinafter, an embodiment of the present invention will be described with reference to the accompanying drawings. In the embodiment, a cooling system for a rotary electric machine (a traveling motor) mounted on a vehicle such as a hybrid automobile, an electric automobile, or the like, is exemplarily described.

<Cooling System for a Rotary Electric Machine>

Figure 1:
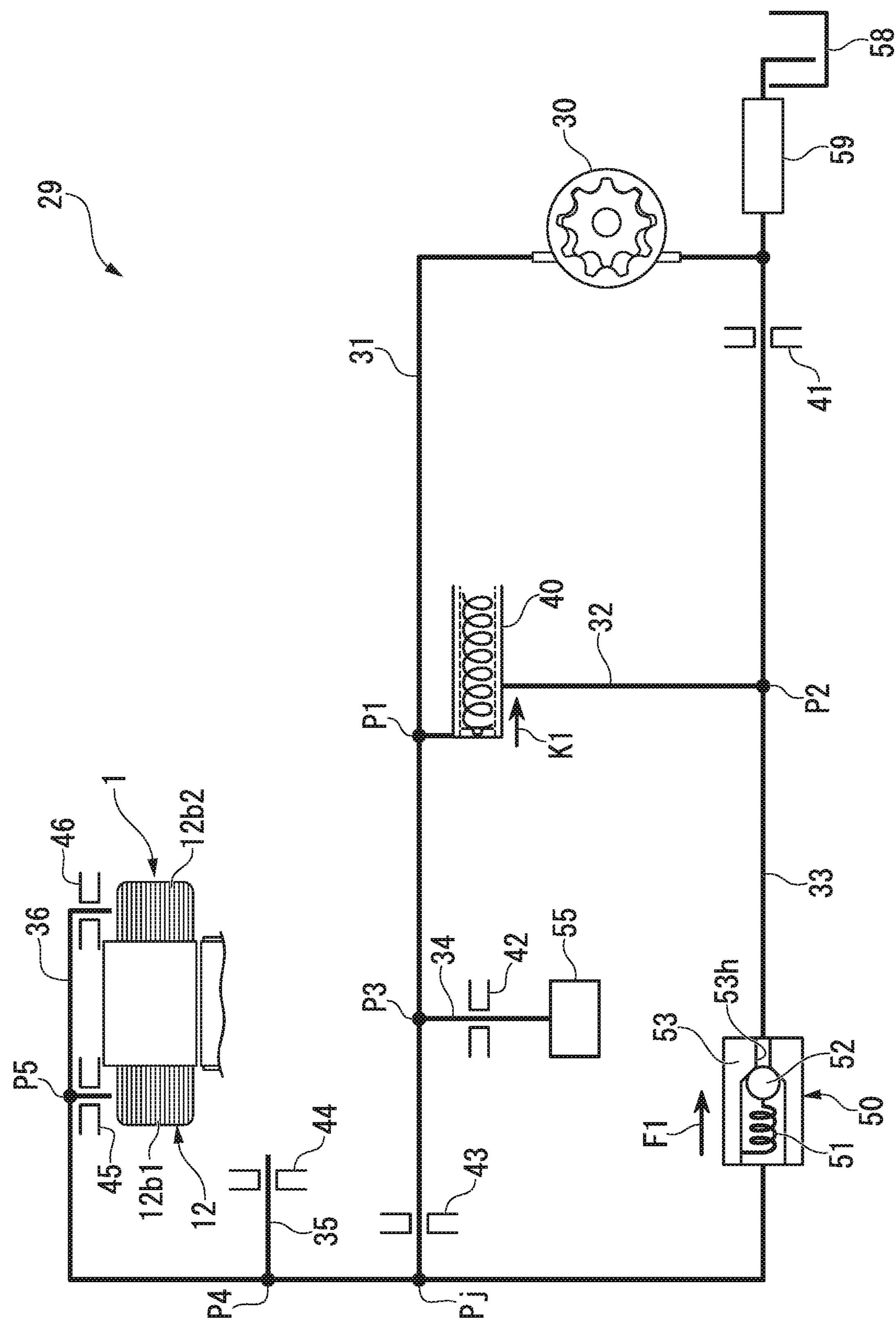
FIG. 1 is a schematic configuration view of a cooling system for a rotary electric machine according to an embodiment.

FIG. 1 is a schematic configuration view showing the entire configuration of the cooling system for a rotary electric machine (hereinafter, simply referred to as "a cooling system") according to the embodiment.

As shown in FIG. 1, a cooling system 29 includes a rotary electric machine 1, a pump 30, a mechanism section 55, a plurality of coolant flow paths 31 to 36, a pressure regulation valve 40 (a pressure regulation part), a plurality of orifices 41 to 46 (a flow rate regulation part), and a switching valve 50 (a flow path switching part). In FIG. 1, reference numeral 58 designates an oil pan, and reference numeral 59 designates a strainer.

<Rotary Electric Machine>

Figure 2:
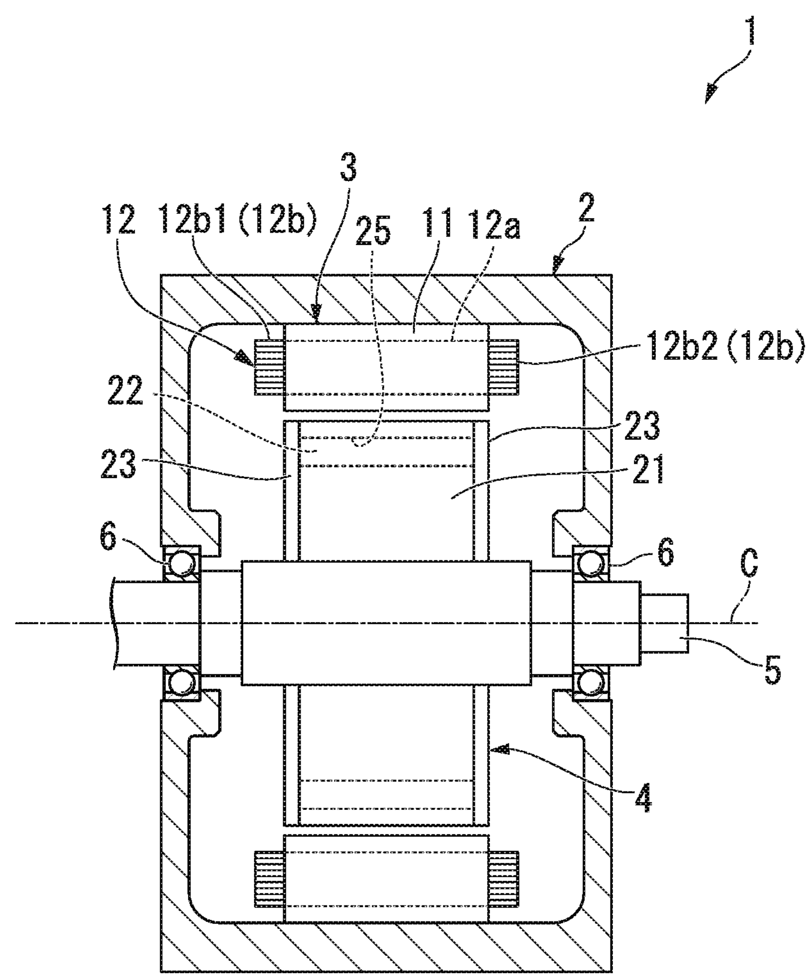
FIG. 2 is a schematic configuration view of a rotary electric machine according to the embodiment.

FIG. 2 is a schematic configuration view showing the entire configuration of the rotary electric machine 1 according to the embodiment. FIG. 2 is a view including a cross section taken along a virtual plane including an axis C.

As shown in FIG. 2, the rotary electric machine 1 includes a case 2, a stator 3, a rotor 4, an output shaft 5, and a coolant supply mechanism (not shown).

The case 2 has a cylindrical box shape configured to accommodate the stator 3 and the rotor 4. A coolant (not shown) is accommodated in the case 2. A part of the stator 3 is disposed in the case 2 while being submerged in the coolant. For example, automatic transmission fluid (ATF) or the like, which is a working oil used for lubrication, power transmission, or the like, of a transmission, is used as the coolant.

The output shaft 5 is rotatably supported by the case 2. In FIG. 2, reference sign 6 designates a bearing that rotatably supports the output shaft 5. Hereinafter, a direction along the axis C of the output shaft 5 is referred to as "an axial direction," a direction perpendicular to the axis C is referred to as "a radial direction" and a direction around the axis C is referred to as "a circumferential direction."

The stator 3 includes a stator core 11, and a coil 12 wound on the stator core 11.

The stator core 11 is formed in a cylindrical shape disposed coaxially with the axis C. The stator core 11 is fixed to an inner circumferential surface of the case 2. For example, stator core 11 is configured by laminating electromagnetic steel plates in the axial direction. Further, the stator core 11 may be a so-called pressed powder core obtained by pressing magnetic metal powder.

The coil 12 is wound on the stator core 11. The coil 12 includes a U phase coil, a V phase coil and a W phase coil, which are disposed to have a phase difference of 120° from each other in the circumferential direction. The coil 12 includes an insertion section 12*a* inserted into a slot (not shown) of the stator core 11, and a coil end portion 12*b* protruding from the stator core 11 in the axial direction. A magnetic field is generated in the stator core 11 by flowing current to the coil 12. In FIG. 2, reference sign 12*b*1 designates a first coil end portion, and reference sign 12*b*2 designates a second coil end portion disposed at a side opposite to the first coil end portion 12*b*1 in the axial direction.

The rotor 4 is disposed inside the stator 3 in the radial direction at an interval therefrom. The rotor 4 is fixed to the output shaft 5. The rotor 4 is configured to be rotatable integrally with the output shaft 5 around the axis C. The rotor 4 includes a rotor core 21, magnets 22 and end plates 23. In the embodiment, the magnets 22 are permanent magnets.

The rotor core 21 is formed in a cylindrical shape disposed coaxially with the axis C. The output shaft 5 is press-fitted and fixed into the rotor core 21 in the radial direction. Like the stator core 11, the rotor core 21 may be configured by laminating electromagnetic steel plates in the axial direction or may be a pressed powder core.

Magnet holding holes 25 passing through the rotor core 21 in the axial direction are formed in an outer circumferential section of the rotor core 21. The plurality of magnet holding holes 25 are disposed at intervals in the circumferential direction. The magnets 22 are inserted into the magnet holding holes 25.

A flow path (a rotor inside flow path), which is not shown, passing through the rotor core 21 in the axial direction is formed in the inner circumferential section of the rotor core 21.

The end plates 23 are disposed at both end portions of the rotor core 21 in the axial direction. The output shaft 5 is press-fitted and fixed into the end plates 23 in the radial direction. The end plates 23 cover at least the magnet holding holes 25 in the rotor core 21 from both sides in the axial direction. The end plates 23 abut outer end surfaces of the rotor core 21 in the axial direction.

In the embodiment, shaft center cooling is performed using a shaft flow path (not shown) formed in the output shaft 5. A coolant such as oil is supplied to the magnets 22 through a shaft flow path and a rotor inside flow path, which are not shown.

<Pump>

The pump 30 (see FIG. 1) is a mechanical oil pump (MOP) driven by a rotational driving force of the output shaft 5 of the rotary electric machine 1. When the pump 30 is driven, oil for a coolant is discharged from the pump 30. The discharged oil is supplied to the coolant flow path. For example, a gear pump, a vane pump, or the like, is used as the pump 30. The pump 30 increases and decreases a flow rate of the coolant according to a magnitude of a rotational speed of the rotary electric machine 1, and pumps the coolant. The pump 30 increases a flow rate of the coolant as a rotational speed of the rotary electric machine 1 is increased. The pump 30 decreases a flow rate of the coolant as a rotational speed of the rotary electric machine 1 is decreased.

<Mechanism Section>

As shown in FIG. 1, the mechanism section 55 is configured to be mechanically connectable to the rotary electric machine 1.

The mechanism section 55 is a power transmission mechanism configured to transfer a rotational power of the output shaft 5 (see FIG. 2) of the rotary electric machine 1 to the pump 30. The mechanism section 55 is constituted by various gears, bearings, and so on.

<Coolant Flow Path>

The plurality of coolant flow paths 31 to 36 are constituted by the sixth coolant flow paths 31 to 36. For example, the plurality of coolant flow paths 31 to 36 are configured by assembling a plurality of pipelines. The six coolant flow paths 31 to 36 are a first coolant flow path 31, a second coolant flow path 32, a third coolant flow path 33, a fourth coolant flow path 34, a fifth coolant flow path 35 and a sixth coolant flow path 36.

The first coolant flow path 31 extends from the pump 30 to the coil 12 (the first coil end portion 12*b*1) of the rotary electric machine 1. The first coolant flow path 31 is formed to guide a coolant from the pump 30 to the first coil end portion 12*b*1.

The second coolant flow path 32 branches off from the first coolant flow path 31, and extends from a branching position P1 (hereinafter, referred to as "a first branching position P1") to the pump 30. The second coolant flow path 32 is formed to guide some of the coolant flowing through the first coolant flow path 31 to the pump 30.

The third coolant flow path 33 is branching off from the second coolant flow path 32, and joins at a position in the first coolant flow path 31 downstream from the first branching position P1 in a flow direction of the coolant. The third coolant flow path 33 extends from a branching position P2 (hereinafter, referred to as "a second branching position P2") in the second coolant flow path 32 to a joining position Pj joining with the first coolant flow path 31. The third coolant flow path 33 is branching off from a space between the pressure regulation valve 40 and the first orifice 41 in the second coolant flow path 32. The third coolant flow path 33 is formed to guide some of the coolant flowing through the second coolant flow path 32 toward the rotary electric machine 1 through the first coolant flow path 31.

The fourth coolant flow path 34 is branching off from the first coolant flow path 31, and extends from a branching position P3 (hereinafter, referred to as "a third branching position P3") to the mechanism section 55. The fourth coolant flow path 34 is formed to guide some of the coolant flowing through the first coolant flow path 31 to the mechanism section 55. The third branching position P3 is provided between the first branching position P1 and the joining position Pj joining with the first coolant flow path 31.

The fifth coolant flow path 35 is branching off from the first coolant flow path 31, and extends from a branching position P4 (hereinafter, referred to as "a fourth branching position P4") to the magnets 22 (see FIG. 2) of the rotary electric machine 1. The fifth coolant flow path 35 is formed to guide some of the coolant flowing through the first coolant flow path 31 toward the magnets 22. For example, the fifth coolant flow path 35 communicates with a shaft flow path (not shown).

The fourth branching position P4 is provided downstream from the joining position Pj in the first coolant flow path 31 in the flow direction of the coolant.

The sixth coolant flow path 36 is branching off from the first coolant flow path 31, and extends from a branching position P5 (hereinafter, referred to as "a fifth branching position P5") to the coil 12 (the second coil end portion 12*b*2) of the rotary electric machine 1. The sixth coolant flow path 36 is formed to guide some of the coolant flowing through the first coolant flow path 31 to the second coil end portion 12*b*2. The fifth branching position P5 is provided at a position between the fourth branching position P4 and the first coil end portion 12*b*1 in the first coolant flow path 31.

<Pressure Regulation Valve>

The pressure regulation valve 40 is provided in the first coolant flow path 31. The pressure regulation valve 40 is able to regulate a pressure in the first coolant flow path 31. A flow rate of the coolant flowing through the first coolant flow path 31 is regulated by the pressure regulation valve 40. The pressure regulation valve 40 regulates a pressure of the first coolant flow path 31 such that a flow rate of the coolant flowing through the first coolant flow path 31 becomes constant when a vehicle speed is a first vehicle speed threshold or more (see FIG. 6). The pressure regulation valve 40 is stroked by applying the pressure of the first branching position P1 to a tip (an upstream end) of the pressure regulation valve 40, and delivers some of the coolant (surplus coolant) flowing through the first coolant flow path 31 to the second coolant flow path 32. An arrow K1 in FIG. 1 designates a direction in which the pressure regulation valve 40 is stroked.

<Orifice>

The plurality of orifices 41 to 46 are constituted by the six orifices 41 to 46. The six orifices 41 to 46 are the first orifice 41 (a flow rate regulation part), the second orifice 42 (a second flow rate regulation part), the third orifice 43 (a third flow rate regulation part), the fourth orifice 44 (a fourth flow rate regulation part), the fifth orifice 45, and the sixth orifice 46.

The first orifice 41 is provided at a position downstream than the pressure regulation valve 40 in the second coolant flow path 32 in the flow direction of the coolant. The first orifice 41 regulates a flow rate of the coolant flowing through the second coolant flow path 32. The first orifice 41 is a throttle provided between the pressure regulation valve 40 and the pump 30 in the second coolant flow path 32.

The second orifice 42 is provided in the fourth coolant flow path 34. The second orifice 42 regulates a flow rate of the coolant flowing through the fourth coolant flow path 34. The second orifice 42 is a throttle provided between the third branching position P3 and the mechanism section 55 in the fourth coolant flow path 34.

The third orifice 43 is provided between the joining position Pj and the third branching position P3 in the first coolant flow path 31. The third orifice 43 regulates a flow rate of the coolant flowing through the first coolant flow path 31. The third orifice 43 is a throttle provided between the joining position Pj and the third branching position P3 in the first coolant flow path 31.

The fourth orifice 44 is provided in the fifth coolant flow path 35. The fourth orifice 44 regulates a flow rate of the coolant flowing through the fifth coolant flow path 35. The fourth orifice 44 is a throttle provided between the fourth branching position P4 and a shaft flow path (not shown) in the fifth coolant flow path 35.

The fifth orifice 45 is provided at a position downstream than the fourth branching position P4 in the first coolant flow path 31 in the flow direction of the coolant. The fifth orifice 45 regulates a flow rate of the coolant flowing through the first coolant flow path 31. The fifth orifice 45 is a throttle provided between the fourth branching position P4 and the first coil end portion 12*b*1 in the first coolant flow path 31.

The sixth orifice 46 is provided in the sixth coolant flow path 36. The sixth orifice 46 regulates a flow rate of the coolant flowing through the sixth coolant flow path 36. The sixth orifice 46 is a throttle provided between the fifth branching position P5 and the second coil end portion 12*b*2 in the sixth coolant flow path 36.

<Switching Valve>

The switching valve 50 is provided in the third coolant flow path 33. The switching valve 50 allows a flow of the coolant from the third coolant flow path 33 to the first coolant flow path 31 when a pressure of a threshold or more is received. The switching valve 50 opens the third coolant flow path 33 when the pressure or the threshold or more is received.

The switching valve 50 has a biasing member 51 such as a spring or the like, a locking member 52 connected to the biasing member 51, and a receiving member 53 configured to receive the locking member 52. For example, the switching valve 50 is a check valve. The biasing member 51 normally biases the locking member 52 in a direction opposite to the flow direction of the coolant (an arrow F1 direction in FIG. 1). A through-hole 53*h* along the third coolant flow path 33 is formed in the receiving member 53. The biasing member 51 normally biases the locking member 52 against the receiving member 53 to close the through-hole 53*h* of the receiving member 53. The locking member 52 moves against a biasing force of the biasing member 51 in the flow direction of the coolant and is separated from the receiving member 53 when a pressure of a threshold or more is received. When the locking member 52 is separated from the receiving member 53, the third coolant flow path 33 is opened and a flow of the coolant to the first coolant flow path 31 is allowed.

<Operation of Cooling System>

Hereinafter, an example of an operation of the cooling system 29 according to the embodiment will be described.

First, the pump 30 is driven. Accordingly, a coolant (oil) stored in an oil pan 58 is discharged from the pump 30. The pump 30 is driven by a rotational driving force of the output shaft 5 (see FIG. 2) of the rotary electric machine 1. The pump 30 increases a flow rate of the coolant as a rotational speed of the rotary electric machine 1 is increased. The pump 30 increases a flow rate of the coolant as a vehicle speed is increased.

Figure 6:
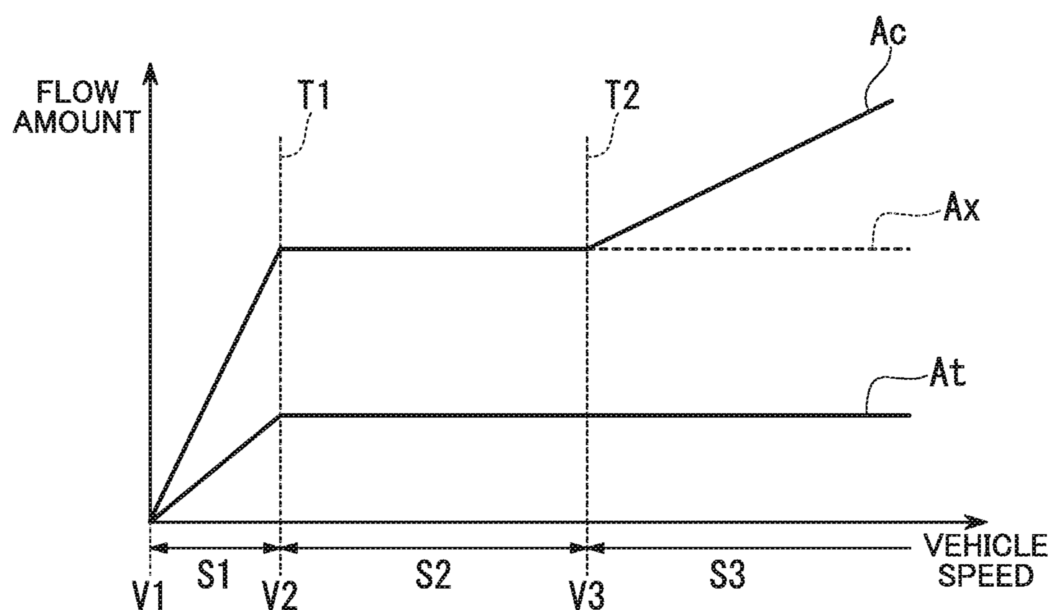
FIG. 6 is a view for explaining an action of a cooling system according to the embodiment.

Here, a vehicle speed zone of a first vehicle speed V1 or more and a second vehicle speed V2 or less is referred to as a first vehicle speed zone S1 (a low vehicle speed zone), a vehicle speed zone of larger than the second vehicle speed V2 and a third vehicle speed V3 or less is referred to as a second vehicle speed zone S2 (a middle vehicle speed zone), and a vehicle speed zone exceeding the third vehicle speed V3 is referred to as a third vehicle speed zone S3 (a high vehicle speed zone) (see FIG. 6). In addition, a flow rate of a coolant in the first vehicle speed zone S1 is referred to as a first flow rate A1, a flow rate of a coolant in the second vehicle speed zone S2 is referred to as a second flow rate A2, and a flow rate of a coolant in the third vehicle speed zone S3 is referred to as a third flow rate A3. The flow rates A1 to A3 of the coolant in the vehicle speed zones S1 to S3 have a relation of A1<A2<A3.

Figure 3:
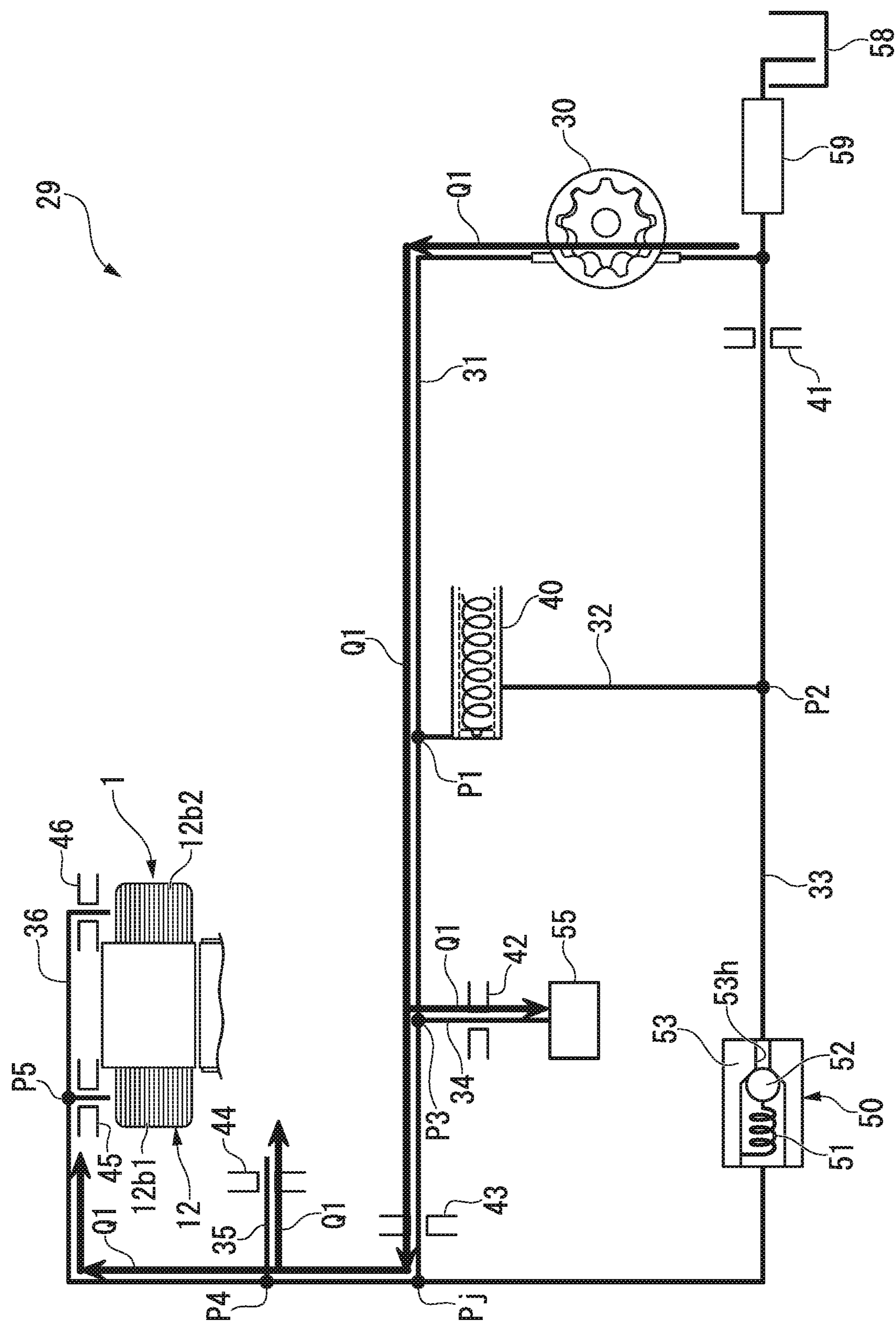
FIG. 3 is a view for explaining a flow of a coolant in a first vehicle speed zone according to the embodiment.

Hereinafter, a flow of a coolant in the first vehicle speed zone S1 will be described with reference to FIG. 3. In FIG. 3, a flow of a coolant in the first vehicle speed zone S1 is represented as an arrow Q1.

In the first vehicle speed zone S1, the coolant discharged from the pump 30 is supplied to the first coolant flow path 31. The coolant supplied to the first coolant flow path 31 flows toward the rotary electric machine 1 through the first coolant flow path 31.

Specifically, the coolant supplied to the first coolant flow path 31 flows toward the first coil end portion **12*b*1 through the first coolant flow path 31. Some of the coolant flowing through the first coolant flow path 31 flows toward the mechanism section 55 through the fourth coolant flow path 34. Some of the coolant flowing through the first coolant flow path 31 flows toward the magnets 22 of the rotary electric machine 1 through the fifth coolant flow path 35. Some of the coolant flowing through the first coolant flow path 31 flows toward the second coil end portion 12*b*2 of the rotary electric machine 1 through the sixth coolant flow path 36**.

The pressure regulation valve 40 regulates a pressure of the first coolant flow path 31 such that a flow rate of the coolant flowing through the first coolant flow path 31 becomes constant when the vehicle speed reaches the second vehicle speed V2. Reference character T1 in FIG. 6 designates timing of pressure regulation by the pressure regulation valve 40.

In the first vehicle speed zone S1, since it is before pressure regulation by the pressure regulation valve 40, it is unlikely that some (surplus coolant) of the coolant flowing through the first coolant flow path 31 flows into the second coolant flow path 32. In a flow of the coolant in the first vehicle speed zone S1, a flow of the arrow Q1 in FIG. 3 becomes a main flow.

In the first vehicle speed zone S1, the switching valve 50 is unlikely to experience a pressure of a threshold or more. In the first vehicle speed zone S1, the switching valve 50 remains closed.

Figure 4:
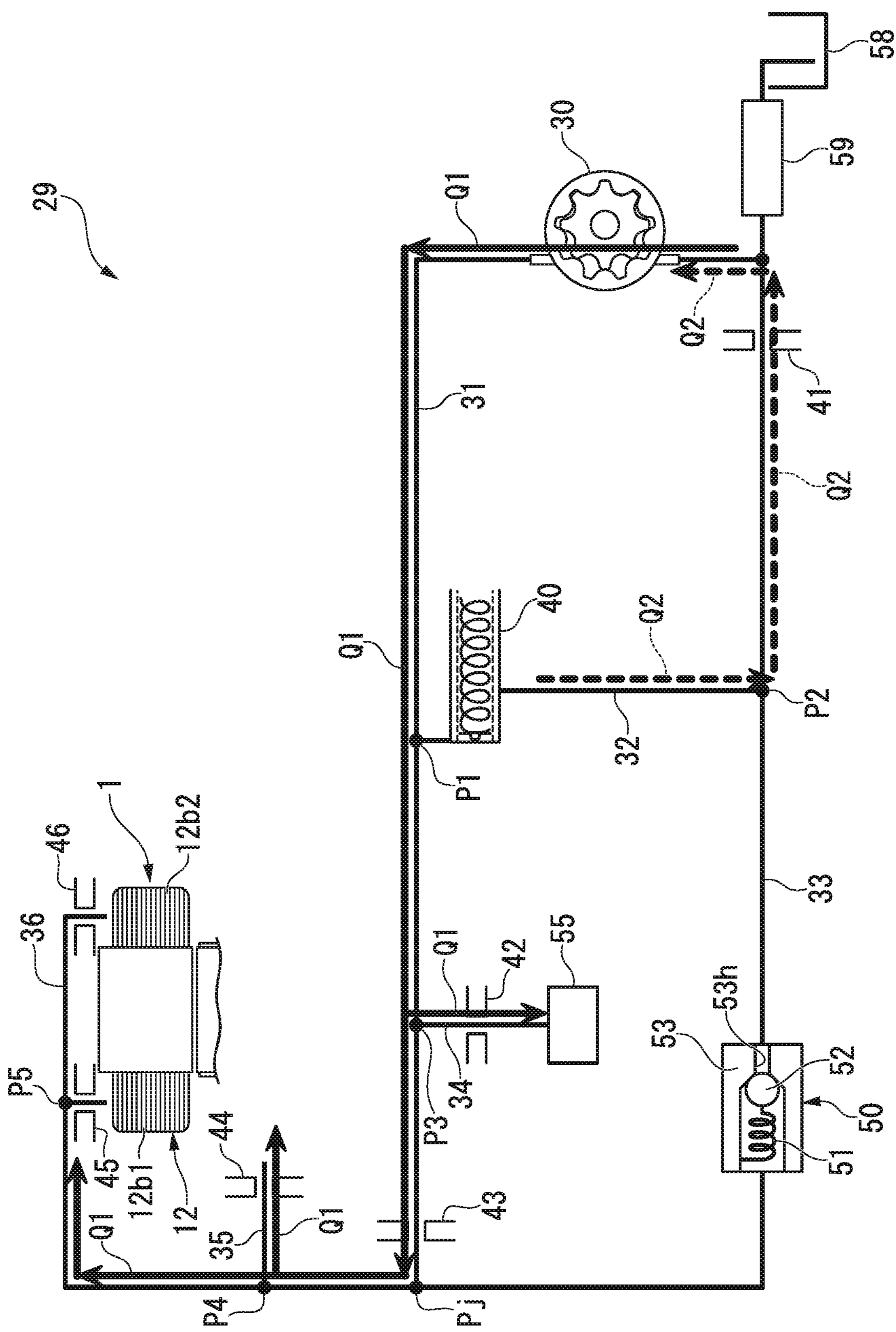
FIG. 4 is a view for explaining a flow of a coolant in a second vehicle speed zone according to the embodiment.

Hereinafter, a flow of the coolant in the second vehicle speed zone S2 will be described with reference to FIG. 4. In FIG. 4, a flow of the coolant in the second vehicle speed zone S2 is represented as an arrow Q2.

In the second vehicle speed zone S2, since it is after pressure regulation by the pressure regulation valve 40, some (surplus coolant) of the coolant flowing through the first coolant flow path 31 flows into the second coolant flow path 32.

Specifically, the coolant flowing into the second coolant flow path 32 flows toward the pump 30 through the second coolant flow path 32. The second coolant flow path 32 functions as a circulation flow path configured to return the surplus coolant in the first coolant flow path 31 to the pump 30.

Since the first orifice 41 is provided in the second coolant flow path 32, the pressure of the second coolant flow path 32 is gradually increased according to an increase in the coolant (surplus coolant) flowing into the second coolant flow path 32. A pressure (hereinafter, referred to as "an upstream pressure") upstream from the switching valve 50 in the third coolant flow path 33 is also gradually increased according to an increase in the coolant flowing into the second coolant flow path 32.

The switching valve 50 allows a flow of the coolant into the first coolant flow path 31 when the vehicle speed reaches the third vehicle speed V3. Reference character T2 in FIG. 6 designates an operation timing of the switching valve 50. In the embodiment, when the vehicle speed reaches the third vehicle speed V3, the first orifice 41 is set such that the upstream pressure is a pressure of a threshold or more in the switching valve 50.

In the second vehicle speed zone S2, since it is before an operation of the switching valve 50, even when some of the coolant flowing through the second coolant flow path 32 flows into the third coolant flow path 33, the coolant is unlikely to flow into the first coolant flow path 31. In the flow of the coolant in the second vehicle speed zone S2, flows of the arrows Q1 and Q2 in FIG. 4 are main flows.

In the second vehicle speed zone S2, the switching valve 50 is unlikely to experience a pressure of a threshold or more. In the second vehicle speed zone S2, the switching valve 50 remains closed.

Figure 5:
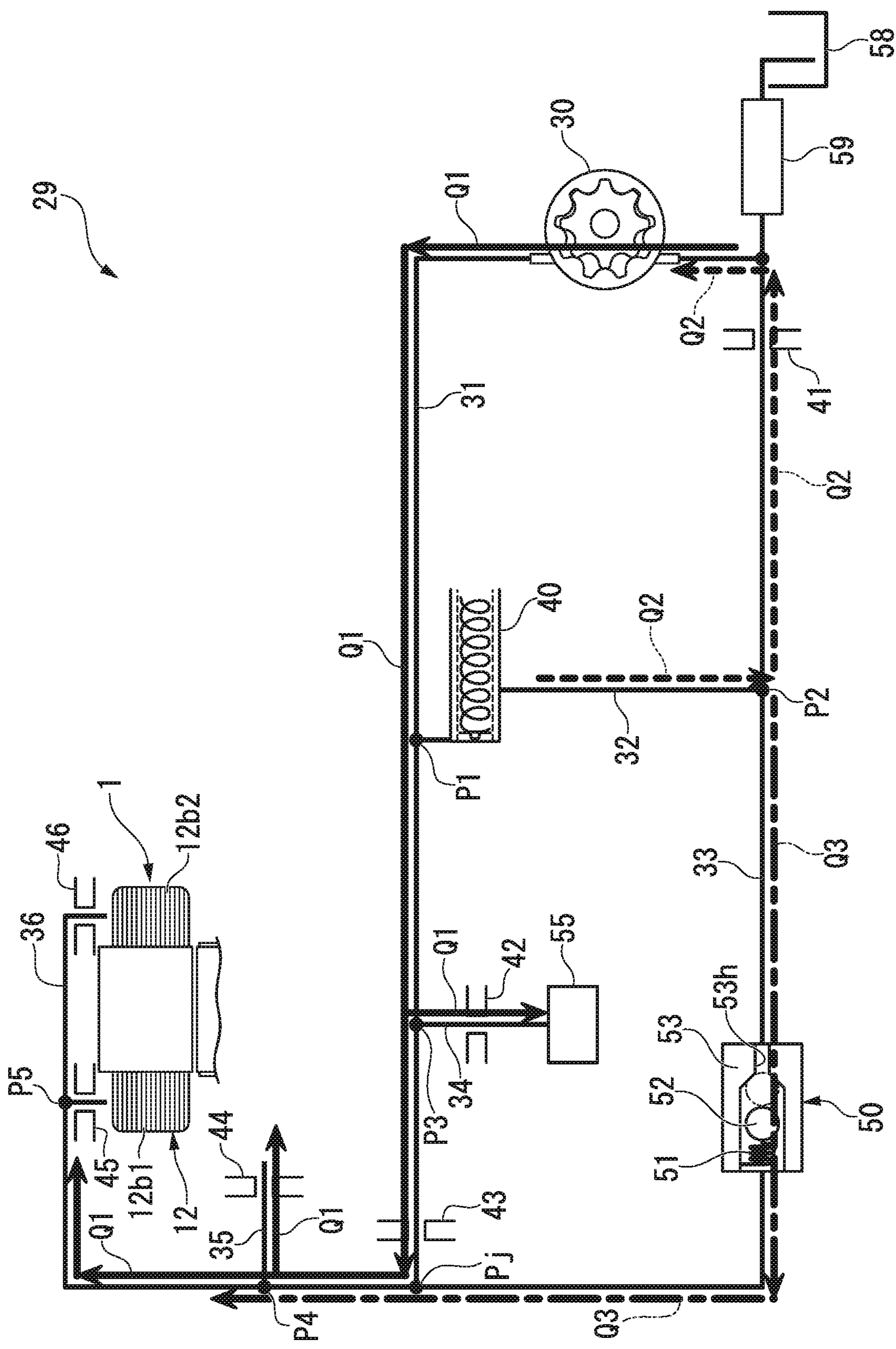
FIG. 5 is a view for explaining a flow of a coolant in a third vehicle speed zone according to the embodiment.

Hereinafter, a flow of a coolant in the third vehicle speed zone S3 will be described with reference to FIG. 5. In FIG. 5, a flow of a coolant in the third vehicle speed zone S3 is represented as an arrow Q3.

In the third vehicle speed zone S3, since it is after pressure regulation of the pressure regulation valve 40 and after an operation of the switching valve 50, some of the coolant flowing through the second coolant flow path 32 flows into the first coolant flow path 31 when flowing into the third coolant flow path 33. A flow of the coolant in the third vehicle speed zone S3 become flows of the arrows Q1 to Q3 in FIG. 5.

Specifically, in the switching valve 50, when the locking member 52 experiences a pressure of a threshold or more, the locking member 52 moves in the flow direction of the coolant against the biasing force of the biasing member 51 and is separated from the receiving member 53. When the locking member 52 is separated from the receiving member 53, the third coolant flow path 33 is opened and a flow of the coolant to the first coolant flow path 31 is allowed. The third coolant flow path 33 functions as a bypass flow path configured to guide some of the coolant flowing through the second coolant flow path 32 to the first coolant flow path 31.

<Action>

Hereinafter, an action of the cooling system 29 of the embodiment will be described with reference to FIG. 6.

First, a comparative example will be described.

A cooling system in the comparative example does not have the second coolant flow path 32 (the circulation flow path) and the third coolant flow path 33 (the bypass flow path) in the embodiment. In the comparative example, cooling/lubrication is performed at a constant flow rate from a low rotational speed state (a low vehicle speed) to a high rotational speed state (a high vehicle speed). Reference character Ax in FIG. 6 designates a cooling flow rate in the comparative example.

In the comparative example, since the flow rate is not increased at a high vehicle speed, the cooling flow rate is not optimized according to the vehicle speed. For example, when the cooling flow rate is set to be on the high vehicle speed side, there is a high possibility that excessive cooling/lubrication will be performed at a low vehicle speed. For this reason, in the comparative example, it may lead to deterioration of driving loss due to an increase in size of the pump or deterioration of stirring friction in a power transmission mechanism.

Next, the embodiment will be described.

In the embodiment, the second coolant flow path 32 (the circulation flow path) and the third coolant flow path 33 (the bypass flow path) are provided, the first orifice 41 is provided downstream than the pressure regulation valve 40 in the second coolant flow path 32 in the flow direction of the coolant, and the switching valve 50 is provided in the third coolant flow path 33. In the embodiment, since the third coolant flow path 33 is a bypass flow path configured to guide some of the coolant flowing through the second coolant flow path 32 to the first coolant flow path 31 according to an operation of the switching valve 50, the flow rate can be increased at a high vehicle speed. In FIG. 6, reference sign Ac designates a cooling flow rate in the embodiment, and reference sign At designates a lubrication flow rate.

Meanwhile, since the second coolant flow path 32 is a circulation flow path configured to circulate some of the coolant flowing through the first coolant flow path 31 toward the pump 30 at a low vehicle speed, it is unlikely to perform excessive cooling/lubrication. Accordingly, in the embodiment, it is unlikely to lead to deterioration in driving loss due to an increase in size of the pump or deterioration in stirring friction of the power transmission mechanism.

As described above, the cooling system 29 of the embodiment includes the rotary electric machine 1, the pump 30 configured to increase and decrease a flow rate of a coolant according to a magnitude of a rotational speed of the rotary electric machine 1 and pump the coolant, the first coolant flow path 31 extending from the pump 30 to the rotary electric machine 1 and configured to guide the coolant to the rotary electric machine 1, the second coolant flow path 32 branching off from the first coolant flow path 31 and configured to guide the coolant to the pump 30, the pressure regulation valve 40 provided in the first coolant flow path 31 and configured to regulate a pressure in the first coolant flow path 31, the first orifice 41 provided at a position downstream than the pressure regulation valve 40 in the second coolant flow path 32 in the flow direction of the coolant and configured to regulate a flow rate of the coolant, the third coolant flow path 33 branching off from a position between the pressure regulation valve 40 and the first orifice 41 in the second coolant flow path 32 and joining to a position downstream than the branching position P1 of the second coolant flow path 32 in the first coolant flow path 31 in the flow direction of the coolant, and the switching valve 50 provided in the third coolant flow path 33 and configured to allow a flow of the coolant to the first coolant flow path 31 when experiencing a pressure of a threshold or more.

According to the configuration, since the pump 30 configured to increase and decrease a flow rate of the coolant according to a magnitude of a rotational speed of the rotary electric machine 1 and pump the coolant is provided, a cooling flow rate at a high vehicle speed is increased by increasing a flow rate of the coolant as a rotational speed of the rotary electric machine 1 is increased, and cooling performance at a high vehicle speed can be improved. Meanwhile, since the flow rate of the coolant is decreased as a rotational speed of the rotary electric machine 1 is reduced, a cooling flow rate at a low vehicle speed can be reduced, and it is possible to avoid excessive cooling from being performed. In addition, since the second coolant flow path 32 branching off from the first coolant flow path 31 and configured to guide the coolant to the pump 30 is provided, it is possible to circulate some (surplus coolant) of the coolant flowing through the first coolant flow path 31 in the second coolant flow path 32. In addition, since the pressure regulation valve 40 provided in the first coolant flow path 31 and configured to regulate the pressure in the first coolant flow path 31 is provided, a flow rate of the coolant flowing through the first coolant flow path 31 can be regulated. In addition, since the first orifice 41 provided at a position downstream than the pressure regulation valve 40 in the second coolant flow path 32 in the flow direction of the coolant and configured to regulate a flow rate of the coolant is provided, a pressure in the second coolant flow path 32 can be increased according to an increase in the coolant at a high vehicle speed. In addition, since the third coolant flow path 33 branching off from a position between the pressure regulation valve 40 and the first orifice 41 in the second coolant flow path 32 and joining to a position downstream than the branching position P1 of the second coolant flow path 32 in the first coolant flow path 31 in the flow direction of the coolant is provided, some of the coolant flowing through the second coolant flow path 32 can flow toward the rotary electric machine 1 through the third coolant flow path 33 and the first coolant flow path 31. In addition, since the switching valve 50 provided in the third coolant flow path 33 and configured to allow a flow of the coolant to the first coolant flow path 31 when experiencing a pressure of a threshold or more is provided, when the coolant flows from the second coolant flow path 32 to the third coolant flow path 33 and a pressure in the third coolant flow path 33 becomes a threshold or more, the coolant from the second coolant flow path 32 can flow toward the rotary electric machine 1 through the third coolant flow path 33 and the first coolant flow path 31. Accordingly, a cooling flow rate can be optimized according to a vehicle speed.

In the embodiment, since the mechanism section 55 mechanically connectable to the rotary electric machine 1 and the fourth coolant flow path 34 branching off from the first coolant flow path 31 and configured to guide the coolant to the mechanism section 55 are provided, the following effects are exhibited. Since some of the coolant flowing through the first coolant flow path 31 can be guided to the mechanism section 55 through the fourth coolant flow path 34, it is possible to lubricate the mechanism section 55 with the coolant. In addition, the second orifice 42 provided in the fourth coolant flow path 34 and configured to regulate a flow rate of the coolant is provided, since a flow rate of the coolant flowing toward the mechanism section 55 through the fourth coolant flow path 34 is restricted, it is possible to cause the coolant to actively flow toward the rotary electric machine 1 through the first coolant flow path 31. That is, the rotary electric machine 1 can be actively cooled by prioritizing a flow of the coolant to the rotary electric machine 1 over the flow of the coolant to the mechanism section 55 while lubricating the mechanism section 55 with the coolant.

In the embodiment, since the branching position P3 of the fourth coolant flow path 34 is provided between the branching position P1 of the second coolant flow path 32 and the joining position Pj of the third coolant flow path 33 joining with the first coolant flow path 31, the following effects are exhibited. The coolant flowing toward the rotary electric machine 1 through the third coolant flow path 33 and the first coolant flow path 31 can be prevented from flowing to the mechanism section 55 through the fourth coolant flow path 34.

In the embodiment, since the third orifice 43 provided between the joining position Pj of the third coolant flow path 33 joining with the first coolant flow path 31 and the branching position P3 of the fourth coolant flow path 34 from the first coolant flow path 31 and configured to restrict a flow rate of the coolant is provided, the following effects are exhibited. The coolant flowing toward the rotary electric machine 1 through the third coolant flow path 33 and the first coolant flow path 31 can be prevented from flowing to the mechanism section 55 through the first coolant flow path 31.

In the embodiment, since the fifth coolant flow path 35 branching off from a position downstream than the third orifice 43 in the first coolant flow path 31 in the flow direction of the coolant and configured to guide the coolant to the magnets 22 of the rotary electric machine 1, and the fourth orifice 44 provided in the fifth coolant flow path 35 and configured to regulate a flow rate of the coolant are provided, the following effects are exhibited. Since some of the coolant flowing through the first coolant flow path 31 can be guided to the magnets 22 through the fifth coolant flow path 35, the magnets 22 can be cooled. In addition, the fourth orifice 44 provided in the fifth coolant flow path 35 and configured to regulate a flow rate of the coolant is provided, since a flow rate of the coolant flowing toward the magnets 22 through the fifth coolant flow path 35 is restricted, the coolant can actively flow toward the rotary electric machine 1 (for example, the coil 12) through the first coolant flow path 31.

While the example in which the rotary electric machine 1 is a traveling motor mounted on a vehicle such as a hybrid automobile, an electric automobile, or the like, has been exemplarily described in the above-mentioned embodiment, there is no limitation thereto. For example, the rotary electric machine 1 may be a power generating motor, a motor for another use, or a rotary electric machine (including a generator) for other than the vehicle.

While the example in which shaft center cooling is performed using the shaft flow path provided in the output shaft 5 has been exemplarily described in the above-mentioned embodiment, there is no limitation thereto. For example, the coolant may be supplied to the magnets 22 along a guidance wall (not shown) provided in the end plates 23 by rotation of the rotor 4. For example, the coolant may be supplied to opening sections of the end plates 23 through a supply port provided in the case 2 or the like.

While the example in which the pump 30 is a mechanical oil pump (MOP) driven by a rotational driving force of the output shaft 5 of the rotary electric machine 1 has been exemplarily described in the above-mentioned embodiment, there is no limitation thereto.

For example, the pump 30 may be an electric oil pump (EOP) driven by a rotational driving force of a pump motor. For example, an independent electric motor that does not rely on a rotational driving force of the output shaft 5 of the rotary electric machine 1 may be used as a pump motor.

While the example in which cooling oil as a coolant is guided to the rotary electric machine 1 has been exemplarily described in the above-mentioned embodiment, there is no limitation thereto. For example, a water jacket may be provided in the case 2 of the rotary electric machine 1, and cooling water serving as a coolant may be guided to a water jacket by a water pump.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A cooling system for a rotary electric machine comprising:

a rotary electric machine;

a pump configured to increase and decrease a flow rate of a coolant according to a magnitude of a rotational speed of the rotary electric machine and pump the coolant;

a first coolant flow path extending from the pump to the rotary electric machine and configured to guide the coolant to the rotary electric machine;

a second coolant flow path branching off from the first coolant flow path and configured to guide the coolant to the pump;

a pressure regulation part provided in the first coolant flow path and configured to regulate a pressure in the first coolant flow path;

a flow rate regulation part provided at a position downstream than the pressure regulation part in the second coolant flow path in a flow direction of the coolant and configured to regulate a flow rate of the coolant;

a third coolant flow path branching off from a position between the pressure regulation part and the flow rate regulation part in the second coolant flow path and joining to a position downstream than the branching position of the second coolant flow path in the first coolant flow path in the flow direction of the coolant; and a flow path switching part provided in the third coolant flow path and configured to allow a flow of the coolant to the first coolant flow path when experiencing a pressure of a threshold or more.

2. The cooling system for a rotary electric machine according to claim 1, further comprising:

a mechanism section mechanically connectable to the rotary electric machine;

a fourth coolant flow path branching off from the first coolant flow path and configured to guide the coolant to the mechanism section; and a second flow rate regulation part provided in the fourth coolant flow path and configured to regulate a flow rate of the coolant.

3. The cooling system for a rotary electric machine according to claim 2, wherein the branching position of the fourth coolant flow path is provided between the branching position of the second coolant flow path and a joining position of the third coolant flow path joining with the first coolant flow path.

4. The cooling system for a rotary electric machine according to claim 3, further comprising a third flow rate regulation part provided between the joining position of the third coolant flow path joining with the first coolant flow path and the branching position of the fourth coolant flow path from the first coolant flow path and configured to regulate a flow rate of the coolant.

5. The cooling system for a rotary electric machine according to claim 4, further comprising:

a fifth coolant flow path branching off from a position downstream than the third flow rate regulation part in the first coolant flow path in a flow direction of the coolant and configured to guide the coolant to a magnet of the rotary electric machine; and a fourth flow rate regulation part provided in the fifth coolant flow path and configured to regulate a flow rate of the coolant.

* * * * *